(12) United States Patent
Ando et al.

(10) Patent No.: US 8,341,931 B2
(45) Date of Patent: Jan. 1, 2013

(54) LIFT-DRIVING ENGAGEMENT CHAIN

(75) Inventors: Takahisa Ando, Osaka (JP); Michio Oitaka, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 393 days.

(21) Appl. No.: 12/713,992

(22) Filed: Feb. 26, 2010

(65) Prior Publication Data

US 2010/0223901 A1 Sep. 9, 2010

(30) Foreign Application Priority Data

Mar. 9, 2009 (JP) ................. 2009-055277

(51) Int. Cl.
*E04H 12/34* (2006.01)
*B66B 9/02* (2006.01)
*B66F 3/00* (2006.01)
*F16G 13/00* (2006.01)

(52) U.S. Cl. ............ 59/78; 59/84; 49/324; 52/108; 187/250; 74/89.21

(58) Field of Classification Search ............. 59/78, 84; 49/324, 325; 52/108, 121; 187/250; 74/89.21; 255/133 R
See application file for complete search history.

(56) References Cited

U.S. PATENT DOCUMENTS

| | | | | |
|---|---|---|---|---|
| 3,645,146 A | * | 2/1972 | Nagin | 74/89.21 |
| 5,355,643 A | * | 10/1994 | Bringolf | 52/108 |
| 6,530,177 B1 | * | 3/2003 | Sorensen | 49/325 |
| 7,621,078 B2 | * | 11/2009 | Phelan et al. | 52/121 |
| 8,069,954 B2 | * | 12/2011 | Kempf | 187/250 |

FOREIGN PATENT DOCUMENTS

| JP | 51-131060 | 11/1976 |
|---|---|---|
| JP | 11-278797 A | 10/1999 |

OTHER PUBLICATIONS

Office Action dated Oct. 21, 2010 as received in related Japanese patent application No. 2009-055277.

* cited by examiner

*Primary Examiner* — David B Jones
(74) *Attorney, Agent, or Firm* — Maschoff Gilmore & Israelsen

(57) ABSTRACT

A lift-driving engagement chain capable of improving buckling strength of a pair of lift-driving engagement chains, by modifying the buckling restricting flat surfaces in order to suppress the force which causes a relative slippage along buckling restricting flat surfaces between hooked inner tooth plates and outer tooth plates that contact each other through the buckling restricting flat surfaces.

4 Claims, 7 Drawing Sheets

LIFT-DRIVING ENGAGEMENT CHAIN

FIELD OF THE INVENTION

The present invention relates to a lift-driving engagement chain. More specifically, the present invention relates to a lift-driving engagement chain for use in a lift system for moving a lift table in parallel with an installation surface, such as those used in performing arts, in manufacturing, transportation, or health-care facilities, and the like.

BACKGROUND ART

Lift systems for lifting objects are currently known in the art which use pairs of transmission chains, i.e., so-called engagement chains, that move up and down by integrally engaging from each other, such as the system shown in Japanese Patent Publication No. 3370928.

In one such system, shown in FIGS. 6 and 7, inner and outer plates 510 and 540 of the engagement chain 500 have buckling restricting flat surfaces 512 and 542, which are formed so as to support a load by facing each other when the inner plates 510 and the outer plates 540 are engaged and integrated by sprockets.

As shown in FIGS. 6 and 7, the buckling restricting flat surface 542a extends along an imaginary line L, with a vertical pitch of 2P and an angle of α from horizontal that runs from a center point PU of a pin press-fitting hole 541c to center point PD of a pin press-fitting hole 541d.

As shown in FIG. 6, when a downward load F is applied to the chain, slippage may occur between the outer plates 540a and 540a due to the component force F1 of the load F acting along the buckling restricting flat surface 542a along the imaginary line L. This slippage may cause a gap between a connecting pin and a bush and a gap between hook portions.

Thus, because there is relative slippage between the outer plates 540, the prior art pair of engagement chain 500 has problems in that it is prone to be inclined or buckled when engaged with an opposing portion of the chain, thus lowering its buckling strength.

FIG. 7 illustrates another problem with the engagement chain 500 which takes place when an upward force F' acts on the outer plate 540a through the buckling restricting flat surface 542a. Specifically, a component force F1' of the force F' is lost in the tangential direction of the buckling restricting flat surface 542a, so that an excessive driving force is required to drive and lift the engagement chain 500.

BRIEF SUMMARY OF THE INVENTION

Accordingly, the present invention seeks to solve the problems of the prior art a pair of lift-driving engagement chains whose buckling strength is improved by suppressing the force in the direction of relative slippage between the buckling restricting flat surfaces of the inner and outer tooth plates. As described more below, this allows the lift-driving engagement chains to more stably lift an object, improves the durability of the chains, reduces driving noises, downsizes the chains, improves the accuracy in positioning the lifted object, reduces the workload to be applied in molding the plates, and reduces the required driving force.

A first aspect of the invention is a lift-driving engagement chain to be used in a pair in an engagement chain type lift system. Each segment of the lift-driving engagement chain comprises a plurality of inner link units each consisting of a pair of hooked inner tooth plates with two bush press-fitting holes formed and buckling restricting flat surfaces formed therein, where the pair of hooked inner tooth plates are connected and disposed apart in the chain width direction by two bushes press-fitted into the two bush press-fitting holes of the hooked inner tooth plates, and at least two outer link units disposed on the outside of the plurality of inner link units in the chain width direction, each consisting a hooked outer tooth plates with two pin press-fitting holes formed and buckling restricting flat surfaces formed therein, where the at least two outer link units are connected to the plurality of inner link units by press-fitting connecting pins into the pair of pin press-fitting holes, wherein when the bushes are engaged by a pair of lifting sprockets, a segment of each of the pair of lift-driving engagement chains is deflected from a chain dividing direction into a chain vertical engagement direction and the hooked inner and outer tooth plates of the segment of the pair of the lift-driving engagement chains engage each other and are driven so as to lift autonomously, wherein when the sprockets are reversely rotated, the engaged hooked inner and outer tooth plates of the segments of the lift-driving engagement chains become disengaged and said chains are deflected and divided from the chain vertical engagement direction into the chain dividing direction, and wherein the buckling restricting flat surfaces of the hooked inner and outer tooth plates, which come into contact when the segments of the lift-driving engagement chain are engaged, is a tangential line which extends from a plate arc shoulder portion with a circumference centered on said bush and pin press-fitting holes.

DETAILED DESCRIPTION OF THE INVENTION

The lift-driving engagement chain 100 of one embodiment of the invention will be explained with reference to the drawings.

Figure 1:
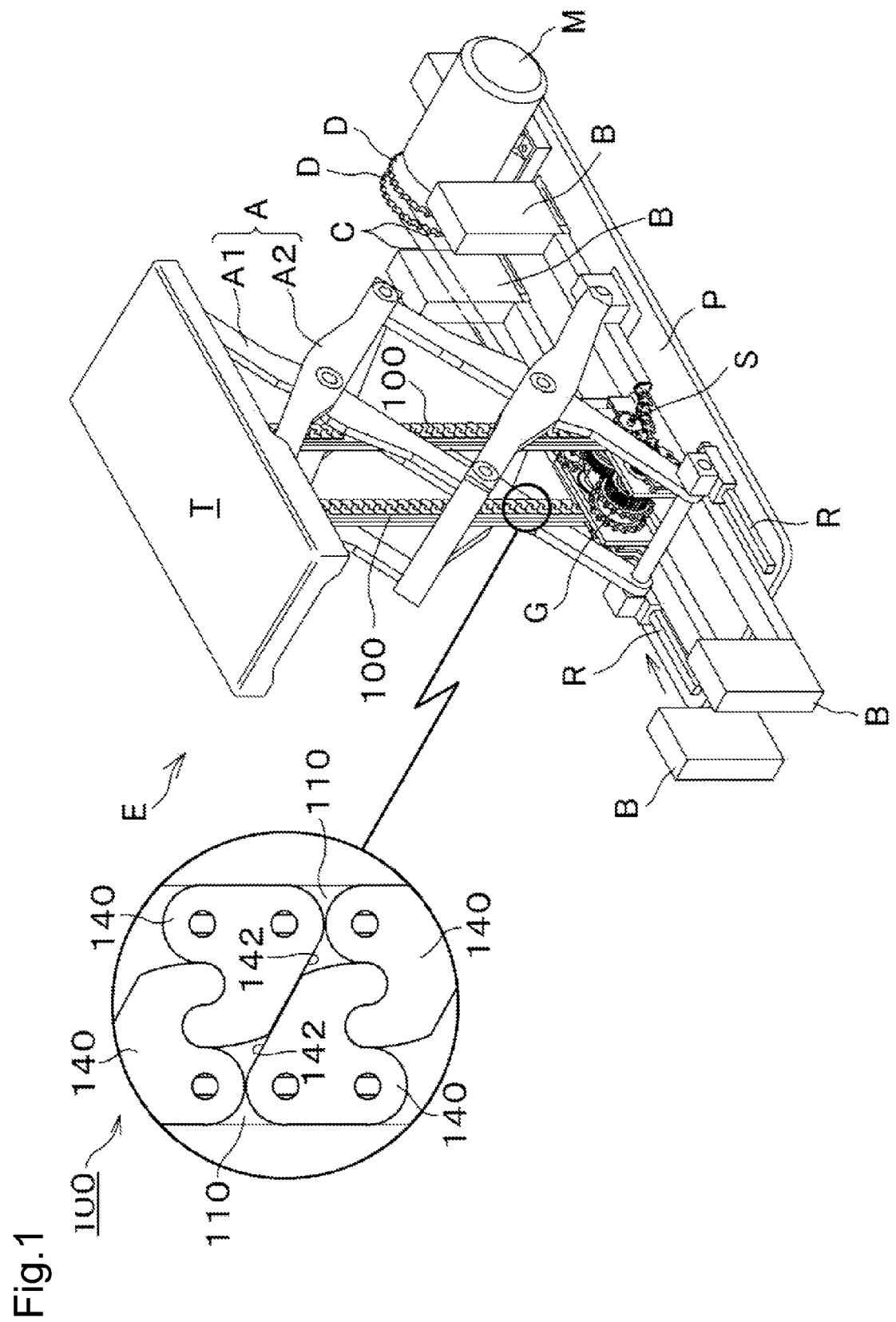
FIG. 1 is a perspective view showing a use of a lift-driving engagement chain according to one embodiment of the invention.

As shown in FIG. 1, the lift-driving engagement chain 100 of one embodiment of the invention is used in an engagement chain type lift system E, which is installed stationary on a working floor. The lift system E lifts a table T on which an object, such as a heavy load (not shown) m may be lifted. The table T is mounted in parallel with the installation surface.

Figure 2:
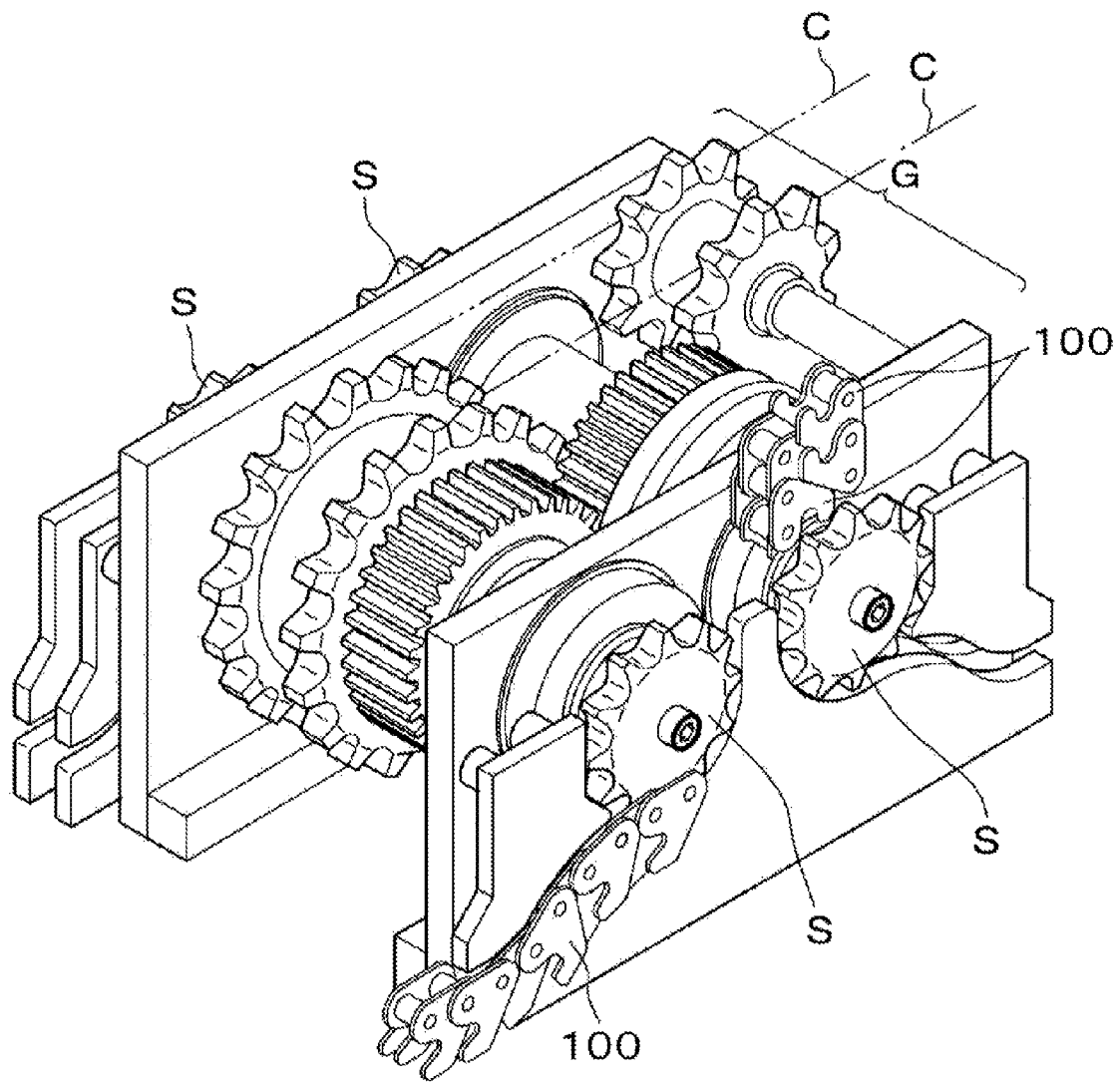
FIG. 2 is a perspective view showing a state in which a lift table and pantograph arms are removed from the configuration shown in FIG. 1.

As shown in FIGS. 1 and 2, the engagement chain type lift system E described above has, as its basic structure, a base plate P installed on the installation surface and pairs of lifting sprockets S which face to each other in the same plane. The sprockets S are centered on a pair of rotational axes juxtaposed in parallel with the base plate P and are capable of rotating forward and backward simultaneously in opposite directions. The system E also includes, in this embodiment, two pairs of lift-driving engagement chains 100 that lift the table T by engaging or disengaging at the lifting sprockets S. The table T is secured to the upper ends of the lift-driving engagement chains 100, and is lifted together with the engagement chains 100 as a result of the driving motor M driving the pairs of lifting sprockets S.

Further, as shown in FIGS. 1 and 2, the engagement chain-type lift system E further includes a pair of driving-side sprockets D coaxially disposed on the side of an output shaft of the driving motor M, a pair of power transmission chains C consisting of roller chains which transmit power from the driving-side sprockets D to the pairs of the lifting sprockets S, a synchronizing gear group G for transmitting the power from the pair of power transmission chains C to the pair of the lifting sprockets S so that the lifting sprockets rotate forward and reversely in the opposite directions from each other, a lift auxiliary guide means A provided between the table T and the base plate P on the side of the installation surface and having upper and lower two interlocked sections, each section being composed of arms of a pantograph in a shape of X. In this instance, the auxiliary guide means A consists of inner arms A1 and outer arms A2. The system. E also includes slide rails R in which lower ends of the inner arms A2 slide corresponding to lifting operations and winding type chain storing boxes B for storing the pair of engagement chains 100 when they are disengaged and divided from each other.

Figure 3:
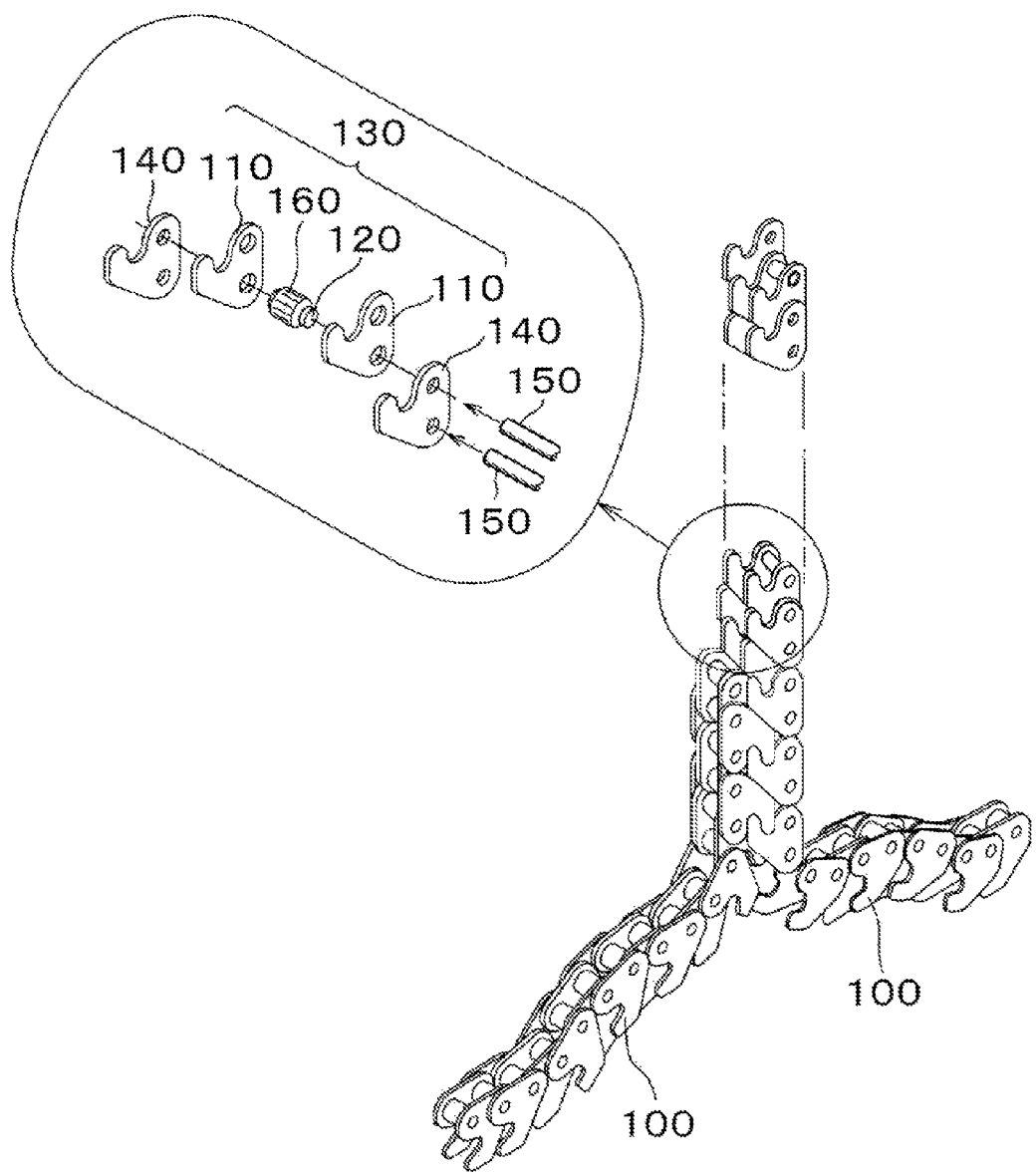
FIG. 3 is a partially enlarged view of the lift-driving engagement chain of the present invention.

As shown in FIG. 3, the lift-driving engagement chain 100 used the engagement chain type lift system E is a so-called chuck chain in which a large number of inner link units 130 are linked in a chain longitudinal direction. The inner link unit 130 has a pair of front and rear bushes 120 press-fitted into bush press-fitting holes 111 of a pair of right and left hooked inner tooth plates 110 which are disposed apart from each other. The large number of inner link units 130 are linked by a pair of front and rear connecting pins 150 press-fitted into a pair of front and rear pin press-fitting holes 141 of hooked outer tooth plates 140 disposed on the outside of the chain in a chain width direction. A roller 160 is fitted around the bush 120 described above.

The pair of lift-driving engagement chains 100 are arranged so that the hooked inner and outer tooth plates 110 and 140 are disposed so as to engage with the opposing engagement chain 100 when the pair of lifting sprockets S deflects the two separated chains 100 from a horizontal, or chain dividing direction, to a chain vertical engagement direction. The engagement chains 100 engage each other while being shifted by a half pitch and rise together autonomously. The engagement chains 100 are also arranged so that the hooked inner and outer tooth plates 110 and 140 disengage and are divided from each other by deflecting from the chain vertical engagement direction to the horizontal direction by the pair of lifting sprockets S.

Figure 4:
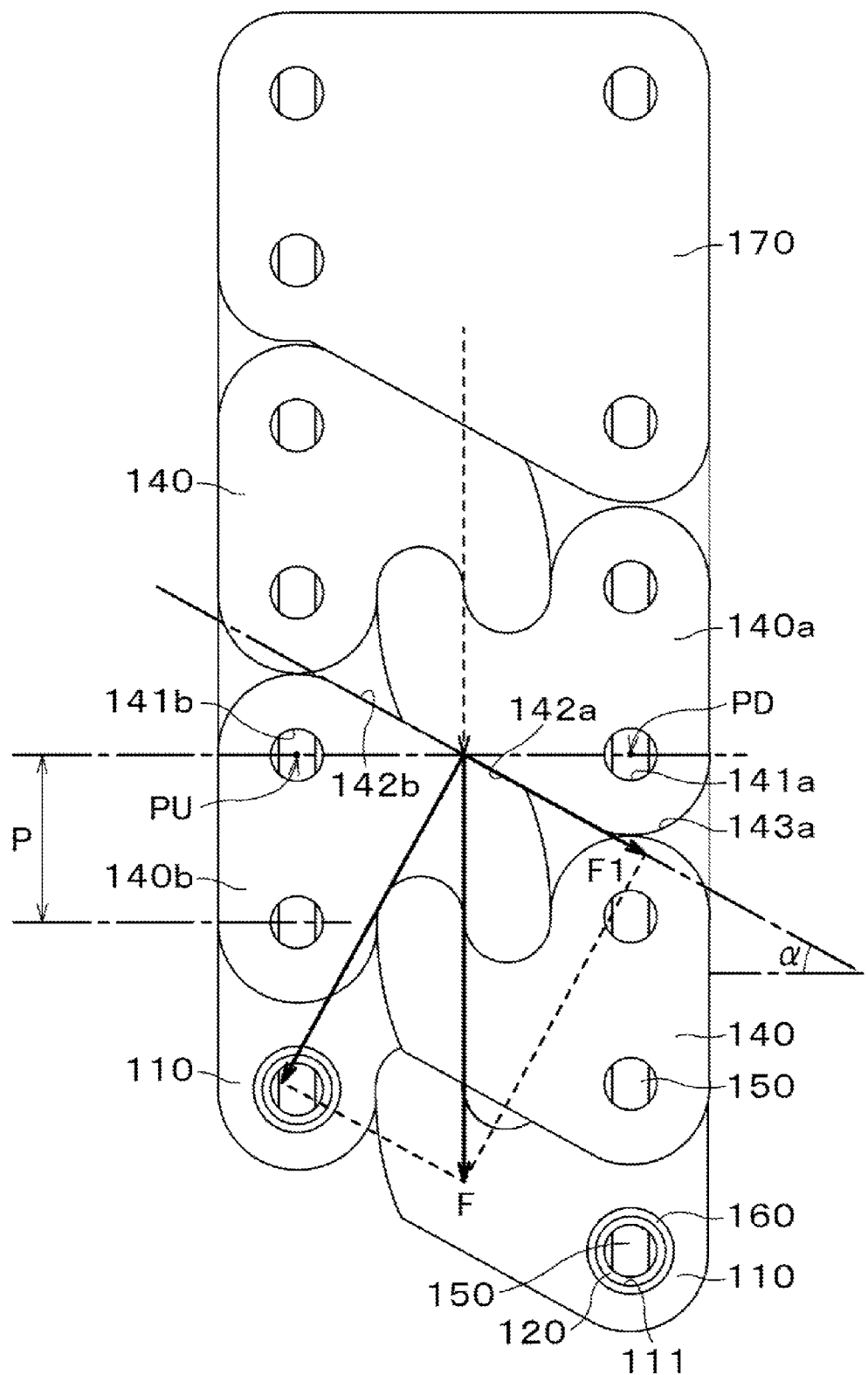
FIG. 4 is a diagram illustrating the result of a downward load being applied to a hooked outer tooth plate of the present invention.

It is noted that a chain end attaching plate 170 is attached to an upper end of the lift-driving engagement chain 100 to connect the lift table T with the lift-driving engagement chain 100 as shown in FIG. 4.

The specific configuration of the buckling restricting flat surfaces 112 and 142 of the hooked inner and outer tooth plates 110 and 140 that are the most characteristic part of the lift-driving engagement chain 100 will now be detailed with reference to FIGS. 4 and 5.

In the lift-driving engagement chain 100 of the present embodiment, the buckling restricting flat surfaces 112 and 142 are formed in the hooked inner and outer tooth plates 110 and 140, respectively. The buckling restricting flat surfaces 112 and 142 contact each other when the hooked inner tooth plates 110 and the hooked outer tooth plates 140 are engaged and integrated by the lifting sprocket S.

As shown in FIG. 4, the buckling restricting flat surface 142a is formed in the hooked outer tooth plate 140a so as to extend from a plate arc shoulder portion 143a centered around a center point PD with a pin press-fitting hole 141a formed therein. An inclination angle $\alpha$ of the buckling restricting flat surface 142 based on a horizontal line is set to be about 30 degrees.

As a result, as compared to the prior art engagement chain 500 in which the inclination angle $\alpha$ of the buckling restricting flat surface 542 is about 45 degrees, which has a vertical offset of approximately two chain pitches 2P, the buckling restricting flat surface 142 of the hooked outer tooth plate 140 is formed with a vertical offset of one chain pitch P and with an inclination angle $\alpha$ of about 30 degrees As such, the buckling restricting flat surface 142 is less inclined in the lift-driving engagement chain 100 of the present embodiment. Accordingly, when a load F caused by the weight of the table T acts vertically downwardly on the hooked outer tooth plate 140b and the hooked outer tooth plate 140a through the buckling restricting flat surfaces 142a and 142b, a component force F1 of the load F acting in the tangential direction of the buckling restricting flat surfaces 142a and 142b becomes smaller than a component force F1 of the load F acting in the tangential direction of the buckling restricting flat surfaces 542a and 542b of the prior art engagement chain 500. Therefore, this arrangement suppresses the force in the direction which causes the relative slippage along the buckling restricting flat surfaces 142a and 142b between the hooked outer tooth plates 140a and 140b.

It is noted that because the inclination angle $\alpha$ of the component force F1 in the lift-driving engagement chain 100 of the present embodiment is set at 30 degrees, the power of the component force is F1=F/2. In contrary, because the inclination angle $\alpha$ of the component force F1 in the prior art engagement chain 500 is set at 45 degrees, the power of the component force is F1=F/$\sqrt{2}$.

Figure 5:
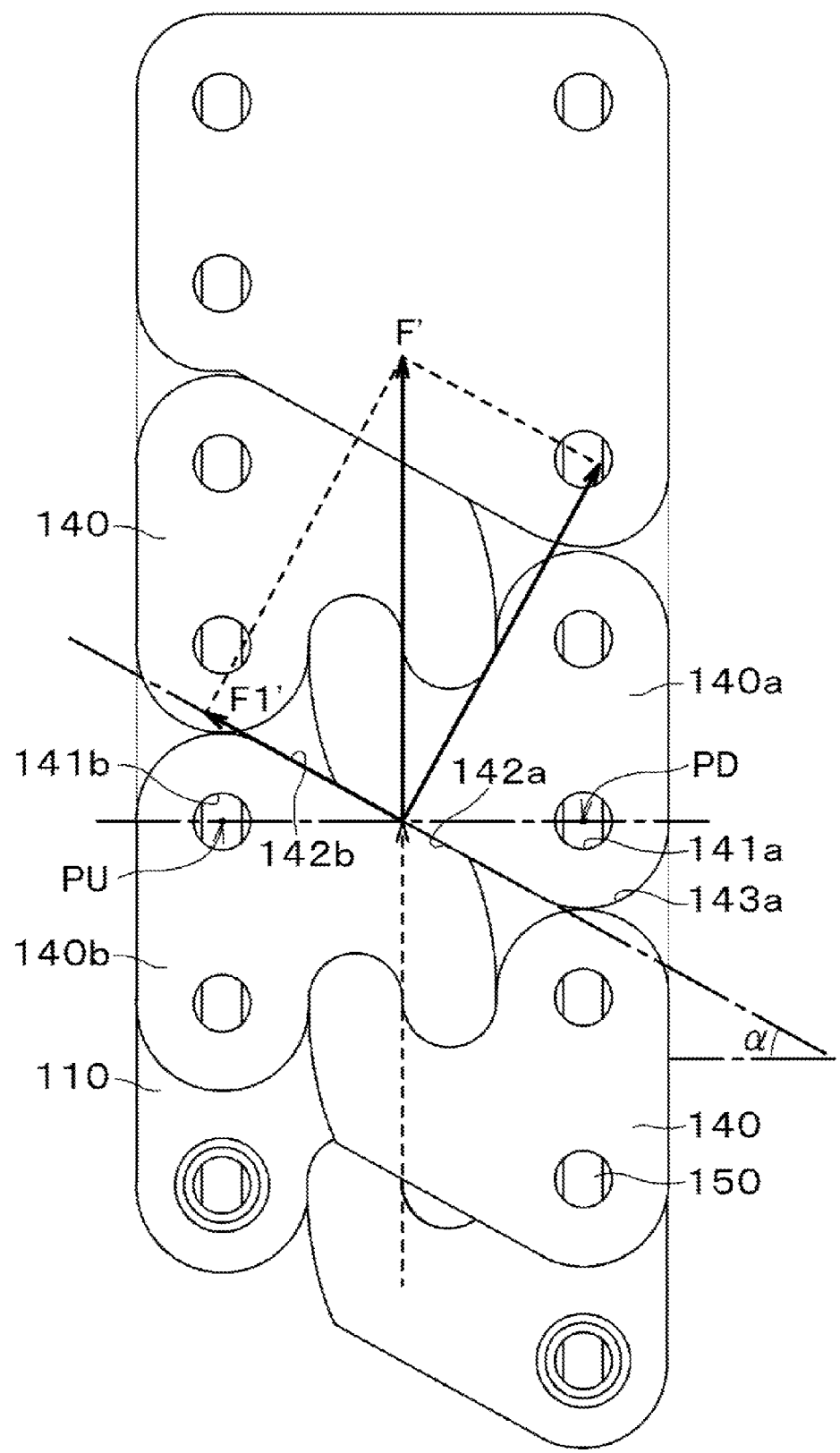
FIG. 5 is a diagram for explaining the result of an upward load being applied to the hooked outer tooth plate of the present invention.
Figure 6:
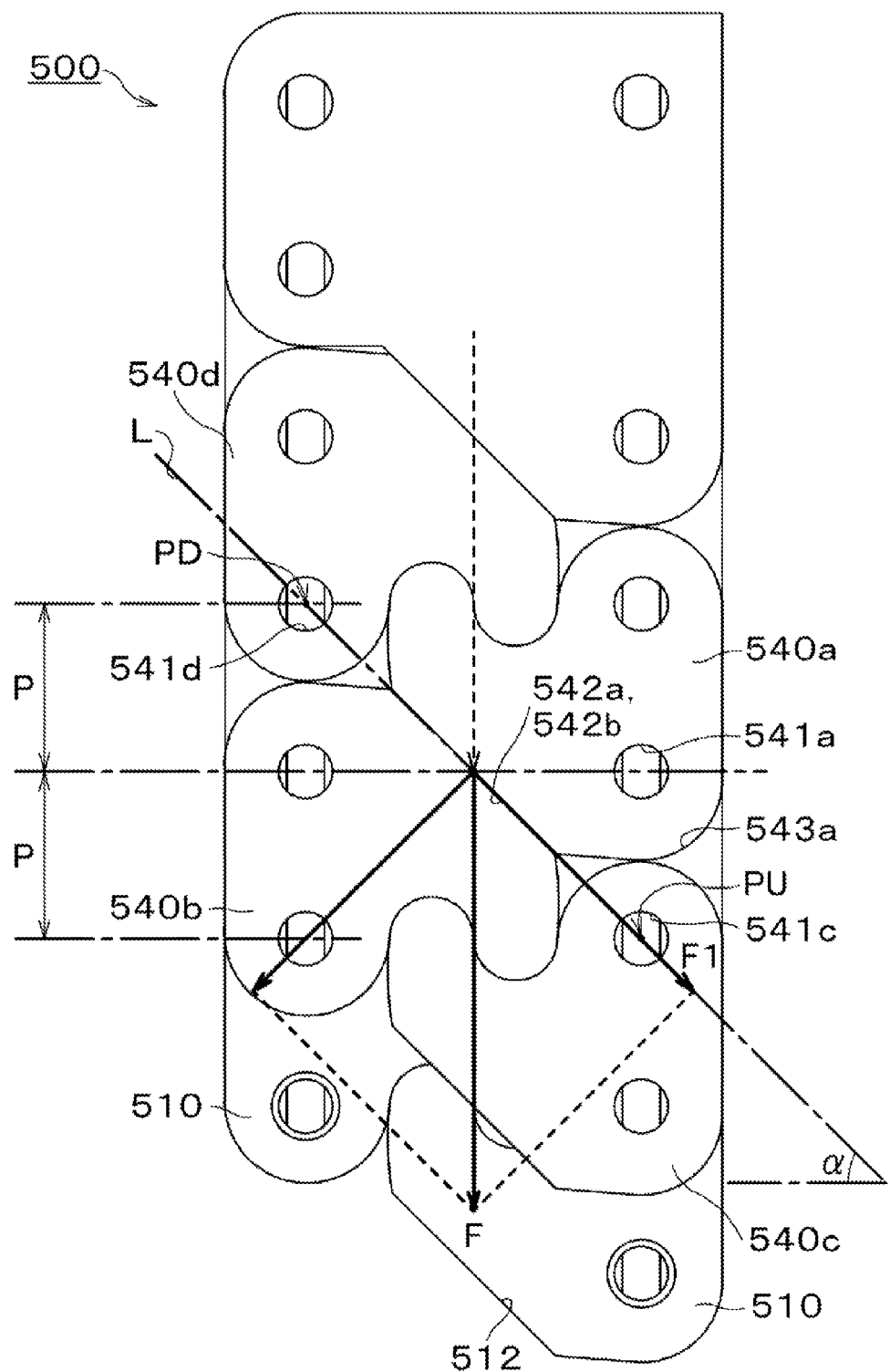
FIG. 6 is a diagram for explaining the result of a downward load being applied to an outer plate of an engagement chain currently known in the art.
Figure 7:
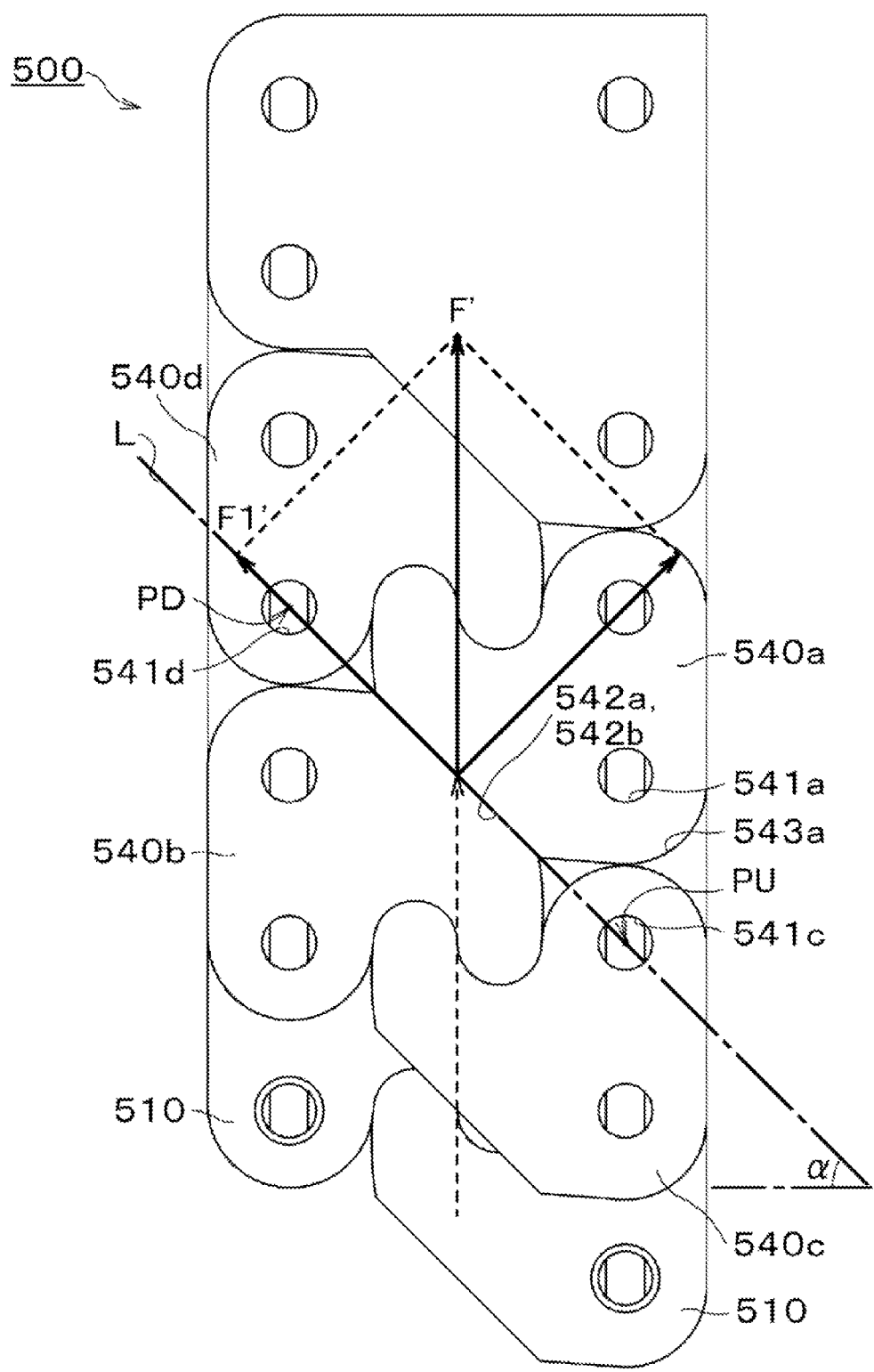
FIG. 7 is a diagram for explaining the result when an upward load is applied to the outer plate of the engagement chain currently known in the art.

In the same manner, as shown in FIG. 5, when a force F' acts vertically upwardly to the preceding hooked outer tooth plate 140a through the buckling restricting flat surface 142a, a component force F1' that is lost in the tangential direction of the buckling restricting flat surface 142a becomes smaller in the lift-driving engagement chain 100 of the present embodiment by reducing the inclination angle $\alpha$ of the buckling restricting flat surface 142. This component force F1' is also smaller than the resulting force illustrated in the prior art engagement chain 500 shown in FIG. 7. Accordingly, this arrangement enables a mechanism for efficiently driving the chain by reducing a driving force required for lifting the lift-driving engagement chain 100.

It is noted that the power of the component force F1' in the lift-driving engagement chain 100 of the present embodiment is F1'=F'/2 and the power of the component force F1' in the prior art engagement chain 500 is F1'=F'/$\sqrt{2}$.

The shape and structure of the hooked inner tooth plate 110 are the same with those of the hooked outer tooth plate 140, and as such an explanation of a buckling restricting flat surface 112 involved in an engaging operation of the hooked inner tooth plate 110 will be omitted here.

The lift-driving engagement chain 100 of the present embodiment obtained as described above has the following effects and advantages. Because the buckling restricting flat surfaces 112 and 142 of the hooked inner and outer tooth plates 110 and 140 of the engagement chain 100 of the present invention are formed with a vertical offset of one chain pitch P and the inclination angle α which is smaller in the lift-driving engagement chain 100 than the engagement chain 500 currently known in the art, the component force F1 of the load F acting in the tangential direction of the buckling restricting flat surfaces 142a and 142b is smaller. Accordingly, it becomes possible to suppress the force in the direction of causing the relative slippage along the buckling restricting flat surfaces 112 and 142 between the hooked inner tooth plates 110 and hooked outer tooth plates 140a in order to improve an upright posture maintaining function, i.e., a so-called buckling strength, of the pair of lift-driving engagement chains 100.

Still more, it becomes possible to stably drive and lift the lift-driving engagement chain 100 to a higher position by improving the buckling strength of the pair of lift-driving engagement chains 100 as described above, and to improve chain durability by avoiding the lift-driving engagement chain 100 from slanting and a partial overload from acting on each chain component. It is also possible to downsize and lighten the chain. Further, it is possible to prevent driving noise from being generated during operation of the chains by improving the engagement accuracy of the lift-driving engagement chains 100 and to improve positioning accuracy of the object to be lifted by keeping the whole length of the chain constant.

Further, when an upward force F' acts on the hooked inner and outer tooth plates 110 and 140 through the buckling restricting flat surfaces 112 and 142, the component force F1' that is lost in the tangential direction of the buckling restricting flat surfaces 112 and 142 is reduced by reducing the inclination angle α of the buckling restricting flat surfaces 112 and 142, as described above. This makes it possible to efficiently drive the lift-driving engagement chains 100 without requiring excessive driving force.

Further, the plate area of the plate arc shoulder portions 113 and 143 is fully assured while reducing the inclination angle α of the buckling restricting flat surfaces 112 and 142 by forming the buckling restricting flat surfaces 112 and 142 so as to extend in the tangential direction from the plate arc shoulder portions 113 and 143 formed centering on the bush and pin press-fitting holes 111 and 141, so that plate strength may be steadily maintained without forming a corner in the plate arc shoulder portions 113 and 143

Additionally, the buckling restricting flat surfaces 112 and 142 are convex-shaped so that they contact each other, even when being elastically deformed.

Accordingly, since the buckling restricting flat surfaces 112 and 142 are continuously in contact without requiring a highly accurate molding process, the manufacturing process required to mold the hooked inner and outer tooth plates 110 and 140 may be reduced.

Thus, aspects of the present invention are not only capable of achieving the lifting operation quickly, and more durably, it is also possible to prevent driving noise from being generated during operation of the chains by improving the engagement accuracy of the chains and to improve positioning accuracy of the object to be lifted by keeping the whole length of the chain constant.

It is possible to modify the examples described herein without departing from the scope or meaning of the claimed invention.

For example, a number of inner link segments disposed in parallel in the chain width direction in the lift-driving engagement chain of the invention may be one or a multiple number such as two or three. When a plurality of segments is disposed in the chain width direction, the hooked outer and inner tooth plates composing one segment engage with the hooked outer and inner tooth plates of the opposing chain segment in order to form a rigid hook, in a manner of a chuck. This connection is repeated across the plurality of segments in the chain direction, so that it becomes possible to steadily suppress buckling that is prone to be generated in the chain width direction of the lift-driving engagement chain, and to realize excellent chain durability and to improve engagement balance with the lifting sprocket in the chain width direction.

Still more, the bush used in the lift-driving engagement chain of the invention may be any type of bush such as one having a normal shape and one obtained by integrally molding a plate with a sprocket engaging portion having a larger diameter than the plate-side press-fitting portion. When the bush composed of the plate-side press-fitting portion and the sprocket engaging portion is adopted, the bush stably contacts with the lifting sprocket at a specific outer peripheral surface of the sprocket engaging portion, so that it becomes possible to prevent contact vibration and contact noise that are prone to be generated when a roller is used between the lifting sprocket and the roller whose center axis is prone to be eccentrically located with respect to the center axis of the connecting pin or the bush in engaging with the lifting sprocket. Still more, because the sprocket engaging portion is molded integrally with the bush and a fully enough thickness is assured as compared to the case of using the roller, it exhibits high load resistance against a load applied in a lifting process.

Further, it is possible to use a configuration where the pitch between the bushes of the hooked inner tooth plates is equalized with a mutual distance between the center of the bush press-fitted into the lower side of the preceding hooked inner tooth plate during the lift driving operation of the lifting sprocket and the center of the bush press-fitted into the upper side of the following hooked inner tooth plate, i.e., such that the pitch between the pins of the hooked outer tooth plates is equalized with a length obtained by adding a difference of diameters of an inner periphery of the bush and an outer periphery of the connecting pin to the pitch between the bushes of the hooked inner tooth plates. When the pitch between the pins and the pitch between the bushes are thus set, it becomes possible to suppress rattle that is often generated between the lifting sprocket when the mutual distances of the respective bushes are unequal. Thus, a smooth engagement state with the lifting sprocket may be realized.

Still more, because the positional relationship in the chain longitudinal direction among the hooked outer tooth plates and hooked inner tooth plates composing one of the pair of lift-driving engagement chains and the hooked outer tooth plates and hooked inner tooth plates composing the other lift-driving engagement chain, i.e., the relationship of level, may be appropriately adjusted by equalizing the mutual distances of the respective bushes during the lift driving operation as described above, the smooth engagement timing among the chains may be realized.

The invention claimed is:
1. A lift-driving engagement chain to be used in a pair in an engagement chain type lift system, the chain having a chain width direction and a chain traveling direction, and each segment of the lift-driving engagement chain comprising:
 a plurality of inner link units each consisting of a pair of hooked inner tooth plates with two bush press-fitting holes formed and buckling restricting flat surfaces formed therein, where the pair of hooked inner tooth plates are connected and disposed apart in the chain width direction by two bushes press-fitted into the two bush press-fitting holes of the hooked inner tooth plates; and at least two outer link units disposed on the outside of the plurality of inner link units in the chain width direction, each consisting a hooked outer tooth plates with two pin press-fitting holes formed and buckling restricting flat surfaces formed therein, where the at least two outer link units are connected to the plurality of inner link units by press-fitting connecting pins into the pair of pin press-fitting holes, wherein when the bushes are engaged by a pair of lifting sprockets, a segment of each of the pair of lift-driving engagement chains is deflected from a chain dividing direction into a chain vertical engagement direction and the hooked inner and outer tooth plates of the segment of the pair of the lift-driving engagement chains engage each other and are driven so as to lift self-sustainably, wherein when the sprockets are reversely rotated, the engaged hooked inner and outer tooth plates of the segments of the lift-driving engagement chains become disengaged and said chains are deflected and divided from the chain vertical engagement direction into the chain dividing direction, and wherein the buckling restricting flat surfaces of the hooked inner and outer tooth plates, which come into contact when the segments of the lift-driving engagement chain are engaged, comprise a tangential line which extends from a plate arc shoulder portion of the hooked inner and outer tooth plates which has a circumference centered on said bush and pin press-fitting holes.

2. The lift-driving engagement chain according to claim 1, characterized in that the buckling restricting flat surfaces are convex so as to continuously be in contact while being elastically deformed.

3. A lift-driving engagement chain to be used in a pair in an engagement chain type lift system, the chain having a chain width direction and a chain traveling direction, and each segment of the lift-driving engagement chain comprising:

a plurality of inner link units each consisting of a pair of hooked inner tooth plates with two bush press-fitting holes formed and buckling restricting flat surfaces formed therein, where the pair of hooked inner tooth plates are connected and disposed apart in the chain width direction by two bushes press-fitted into the two bush press-fitting holes of the hooked inner tooth plates; and at least two outer link units disposed on the outside of the plurality of inner link units in the chain width direction, each consisting a hooked outer tooth plates with two pin press-fitting holes formed and buckling restricting flat surfaces formed therein, where the at least two outer link units are connected to the plurality of inner link units by press-fitting connecting pins into the pair of pin press-fitting holes, wherein when the bushes are engaged by a pair of lifting sprockets, a segment of each of the pair of lift-driving engagement chains is deflected from a chain dividing direction into a chain vertical engagement direction and the hooked inner and outer tooth plates of the segment of the pair of the lift-driving engagement chains engage each other and are driven so as to lift self-sustainably, wherein when the sprockets are reversely rotated, the engaged hooked inner and outer tooth plates of the segments of the lift-driving engagement chains become disengaged and said chains are deflected and divided from the chain vertical engagement direction into the chain dividing direction, and wherein the buckling restricting flat surfaces of the hooked inner and outer tooth plates, which come into contact when the segments of the lift-driving engagement chain are engaged, has an inclination angle of approximately 30 degrees.

4. The lift-driving engagement chain according to claim 3, characterized in that the buckling restricting flat surfaces are convex so as to continuously be in contact while being elastically deformed.

\* \* \* \* \*